United States Patent
Salotto (10) Patent No.: US 7,412,996 B2
(45) Date of Patent: Aug. 19, 2008

(54) APPARATUS FOR HOT APPLYING STRIPS OR FILMS ON TEXTILE OR NON TEXTILE SUPPORTS

(75) Inventor: Luciano Salotto, Vigano Di Gaggiano (IT)

(73) Assignee: FRA-SER S.p.A., Milan (IT)

( * ) Notice: Subject to any disclaimer, the term of this patent is extended or adjusted under 35 U.S.C. 154(b) by 392 days.

(21) Appl. No.: 10/498,431

(22) PCT Filed: Dec. 11, 2002

(86) PCT No.: PCT/IT02/00778

§ 371 (c)(1),
(2), (4) Date: Jan. 18, 2005

(87) PCT Pub. No.: WO03/053659

PCT Pub. Date: Jul. 3, 2003

(65) Prior Publication Data

US 2005/0126460 A1 Jun. 16, 2005

(30) Foreign Application Priority Data

Dec. 12, 2001 (IT) .......................... MI2001A2622

(51) Int. Cl.
*B29C 65/10* (2006.01)
*B32B 37/18* (2006.01)
*B32B 41/00* (2006.01)

(52) U.S. Cl. ........................ 156/361; 156/496; 156/497; 156/499; 156/544; 156/545

(58) Field of Classification Search .............. 156/304.3, 156/361, 494, 495, 497, 499, 544, 545, 554, 156/555; 112/152
See application file for complete search history.

(56) References Cited

U.S. PATENT DOCUMENTS

| 1,097,864 | A | | 5/1914 | Knopf et al. |
| 2,480,882 | A | | 9/1949 | Schmidt et al. |
| 2,628,580 | A | | 2/1953 | Willis |
| 3,808,995 | A | * | 5/1974 | Dobner et al. .............. 112/313 |
| 4,353,158 | A | * | 10/1982 | Henshaw ................... 29/401.1 |
| 4,389,951 | A | | 6/1983 | von Hagen |

(Continued)

FOREIGN PATENT DOCUMENTS

DE 31 50 136 9/1982

(Continued)

*Primary Examiner*—George R Koch, III
(74) *Attorney, Agent, or Firm*—James V. Costigan; Hedman & Costigan, P.C.

(57) ABSTRACT

An apparatus for assembling and hemming fabrics by hot applying strips (5) or films (5) to which thermofusible plastic materials have been applied or spread, comprising, on a bearing framework, a strip or film supplying spool (4), the strip or film being entrained on a pulling roller (7), cooperating with a sensor roller (8) mounted on a swinging lever (9), supporting a strip guiding pawl (13), the strip being further entrained on a strip supply pulling element. Downstream of the pawl (13) a guiding assembly is provided, having an adjustable width, and at the outlet of said guiding assembly, a pressing roller (30) is arranged, which is associated with a foot assembly (31), cooperating with entraining grippers (33, 34) for driving with an indexing type of movement, the fabric materials on which the strip (5) is applied.

10 Claims, 6 Drawing Sheets

U.S. PATENT DOCUMENTS

| | | | |
|---|---|---|---|
| 4,479,449 A | 10/1984 | Raiche | |
| 4,624,202 A | 11/1986 | Alberti et al. | |
| 5,000,104 A | 3/1991 | Marbacher | |
| 5,178,081 A * | 1/1993 | von-Hagen et al. | 112/470.33 |
| 6,053,230 A | 4/2000 | Pelland | |
| 6,129,809 A | 10/2000 | Ellenberger et al. | |
| 2004/0074597 A1 * | 4/2004 | Biro et al. | 156/304.3 |

FOREIGN PATENT DOCUMENTS

| | | |
|---|---|---|
| DE | 36 21 743 | 1/1988 |
| DE | 40 25 192 | 2/1992 |
| GB | 1 260 467 | 1/1972 |
| GB | 1 455 065 | 11/1976 |
| JP | 09-056945 | 3/1997 |

* cited by examiner

APPARATUS FOR HOT APPLYING STRIPS OR FILMS ON TEXTILE OR NON TEXTILE SUPPORTS

This application is a 371 of PCT/IT02/00778, filed on Dec. 11, 2002.

BACKGROUND OF THE INVENTION

The present invention relates to an apparatus for continuously applying, by a hot applying method, rigid and/or elastic strips or films, either clear, colored, printed upon, embossed and/or decorated, on fabrics and/or materials in general.

The present invention allows to perform the following operations:
 joining two surfaces by strips and/or films;
  arranging a strip and/or film on an edge of a textile support, but not for obtaining a decorative effect;
  arranging a strip or film on an edge of a textile support, but not for providing a decorating effect, but for providing the edge with resilient properties;
  curling at will the support element by controlling a differential assembly.

As is known, for making cloth articles, and in particular female underwear article, it is conventional to use fabric materials having a comparatively low weight.

In this case, during the preparing of the mentioned cloth articles, the use of seams causes an undesired thickness increase.

For solving the above mentioned problem, strips or films are hot applied to the cloth articles, both for assembling the fabric pieces, and for hemming or trimming the edge portion of the fabric materials, to provide a satisfactory finishing and strength for the cloth article.

SUMMARY OF THE INVENTION

Accordingly, the aim of the present invention is to overcome, during the application of the mentioned strips or films, the above mentioned drawbacks, by providing an apparatus for hot applying strips or films, with several application characteristics, with respect to the shape, width, elasticity and stiffness, which apparatus is designed to operate like a conventional seaming machine.

Within the scope of the above mentioned aim, a main object of the present invention is to provide such an apparatus for continuously hot applying a strip or film, in a very functional and safe manner, without the need of performing specifically designed operating steps.

Another object of the present invention is to provide such an apparatus for hot applying strips or films which, owing to its constructional features is very reliable and safe in operation.

Yet another object of the present invention is to provide such an apparatus for hot applying extruded strips, to which resin or adhesive material has been applied, which apparatus provides the cloth article field with great practical improvements.

According to one aspect of the present invention, the above mentioned aim and objects, as well as yet other objects, which will become more apparent hereinafter, are achieved by an apparatus for assembling, hemming, plasticizing, applying at will rigid and/or elastic strips or films, either with or without a trimming of the edge portion thereof, on fabrics or supports, either of a textile or of a non-textile nature, by a hot applying method, characterized in that said apparatus comprises, on a bearing framework, a strip or film supplying spool, said strip or film being entrained on a pulling roller therewith a sensor roller cooperates, said sensor roller being mounted on a swinging lever controlling the amount and tension of the strip being entrained, depending on the apparatus working speed.

Downstream of the swinging lever is provided a guiding assembly, of an adjustable type, at the outlet of which is provided a strip pressing roller, cooperating with driving grippers, for causing the fabric pieces to be fed with an indexing type of movement for applying said strip thereon.

BRIEF DESCRIPTION OF THE DRAWINGS

Further characteristics and advantages of the present invention will become more apparent hereinafter from the following detailed disclosure of a preferred, though not exclusive, embodiment of an apparatus for hot applying strips and/or thermoadhesive films, which is illustrated, by way of an indicative, but not limitative example, in the figures of the accompanying drawings, where.

DESCRIPTION OF THE PREFERRED EMBODIMENTS

With reference to the number references of the above mentioned figures, the apparatus for hot applying strips or films, according to the present invention, comprises a modular supporting framework, generally indicated by the reference number 1, which supports the operating or working plane or surface 2 on which is arranged a fabric material to be processed.

On the upper framework (FIG. 1) is provided a supporting arm 3 supporting a strip or film 5 spool or bobbin 4.

Figure 1:
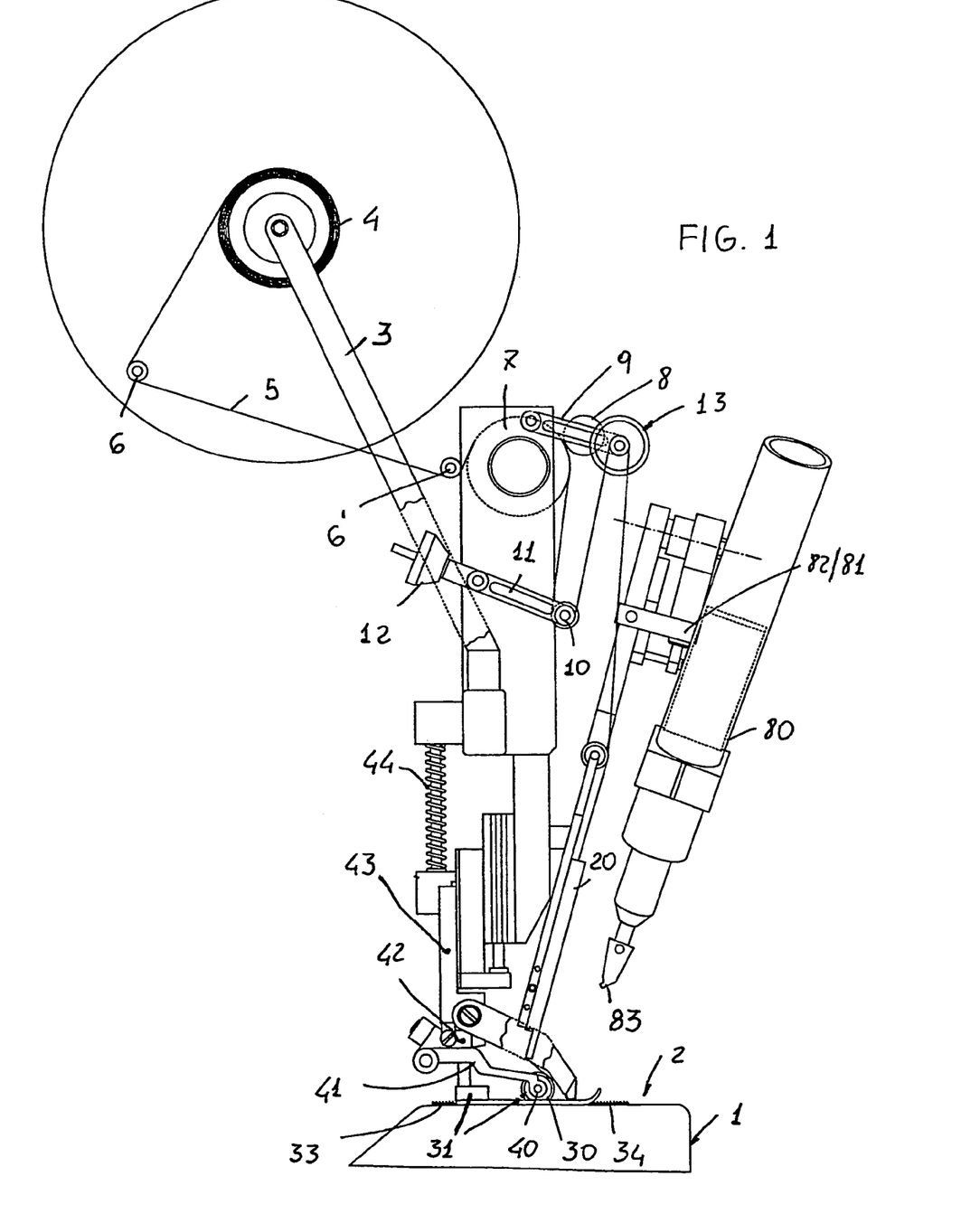
FIG. 1 is a side elevation view schematically illustrating the apparatus according to the invention.

On a side of said strip or film 5 is applied, for example by spreading, a layer of polyurethane or thermofusible resins, made of any desired plastic materials.

The strip 5, is entrained on two transmission or entrainment pawls 6 and 6', and is driven by a pulling roller 7, which is knurled and is driven by a D.C. motor reducing unit.

A sensor roller 8 cooperates with said pulling roller 7, said sensor roller 8 being mounted on a swinging lever 9.

In operation, the strip 5, upon passing through the pulling roller 7, is entrained on an enhancer roller 10, which is mounted on a swinging lever 11, which supports a counterweight 12 arranged at its opposite end portion, i.e. at the end portion thereof opposite to the strip 5 enhancer roller.

At the outlet of the roller 10, the strip 5 is entrained on a pawl 13, applied to the end portion of the swinging lever 9.

The lever 11, in turn, operates as a sensor lever to adjust the strip 5 feeding speed.

As the strip is applied to a fabric material, it is supplied from the supplying spool, with an applying speed which is determined by the transport speed of the apparatus grippers.

In particular, as the strip is supplied, it will tend to provide a pulling force on the pawl 13 applied to the lever 9, which will perform a swinging movement, thereby actuating induction sensors, driving a timed feeding of the strip.

Thus, the strip, after having passed the pawl 13, will pass on a guiding assembly 20, comprising a plurality of adjustable plates, to fit the different widths of strips o films, preferably from 10 to 20 mm.

Figure 4:
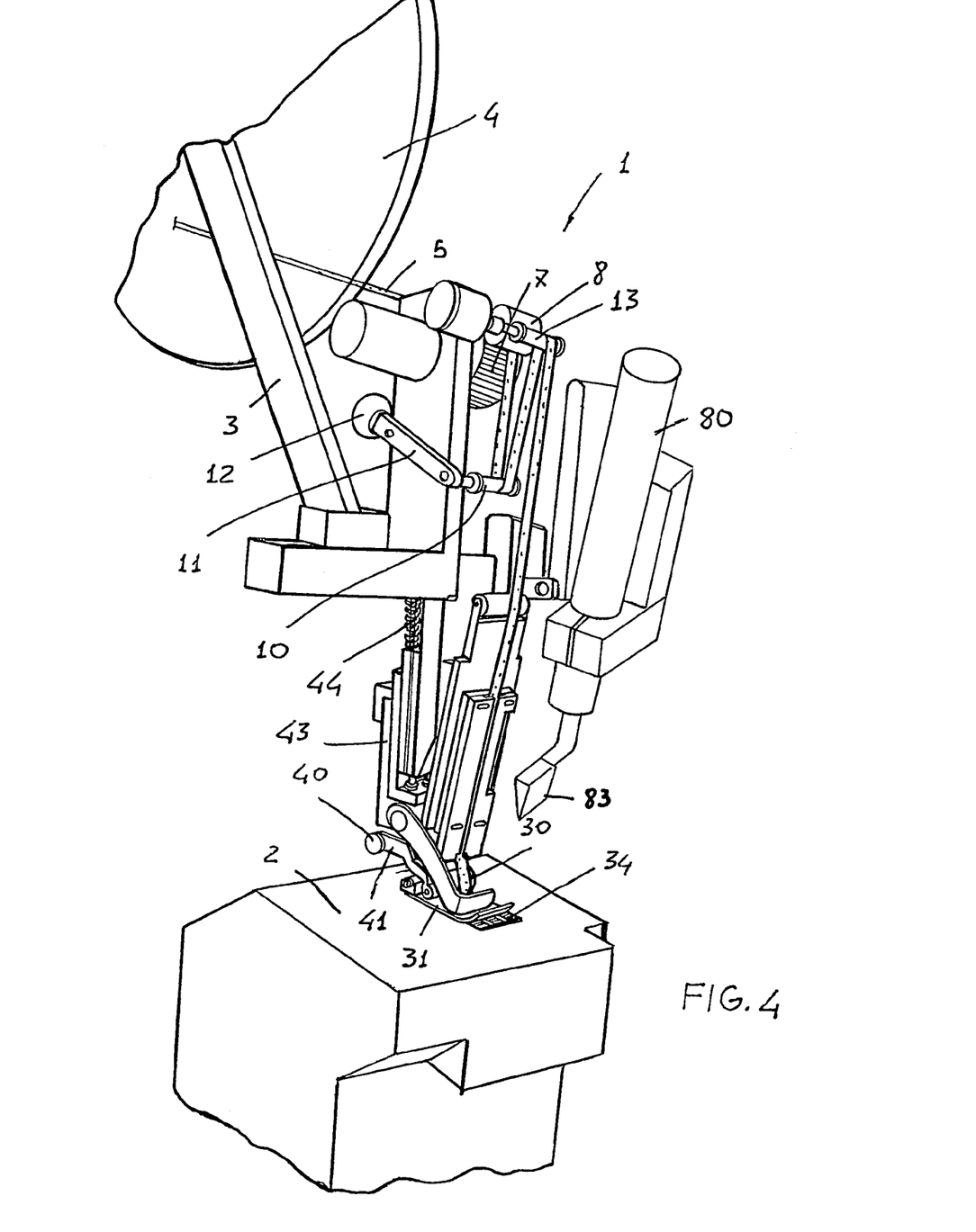
FIG. 4 is a schematic perspective view illustrating an applying assembly included in the apparatus according to the invention.

The strip, which has been surface processed by spread thermoplastic resins, engages, at the outlet of the guiding assembly 20, on a pressing roller 30 arranged inside a slide element of the foot member 31, operating as a strip pressing element for pressing the strip on the fabric material to which the strip must be applied.

Figure 2:
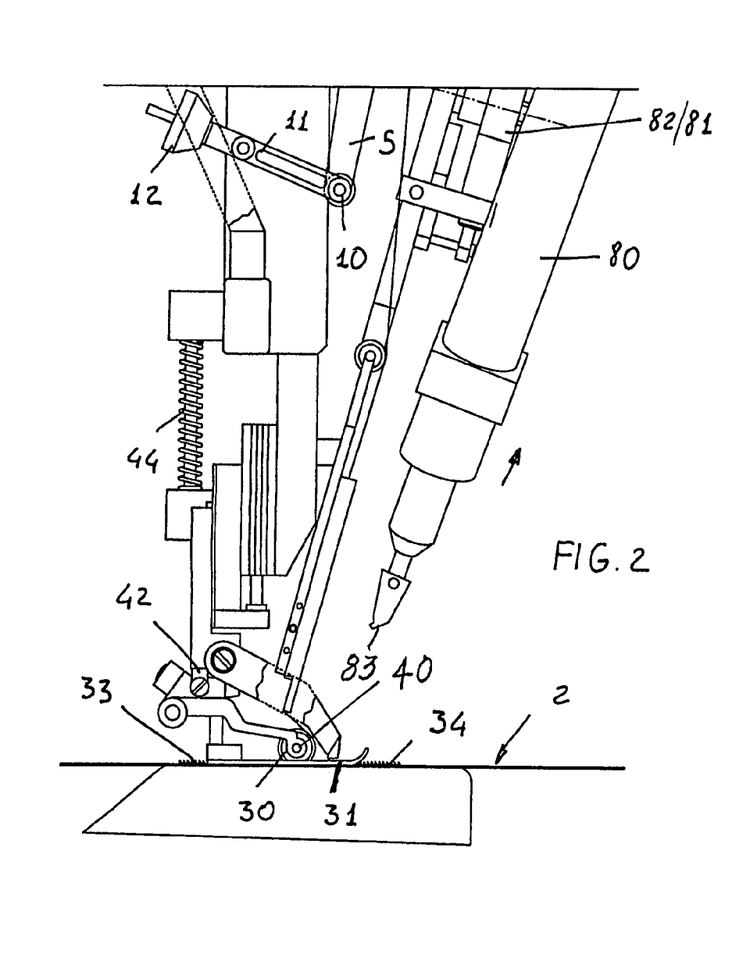
FIG. 2 shows a detail of a foot element for feeding the fabric materials.
Figure 5:
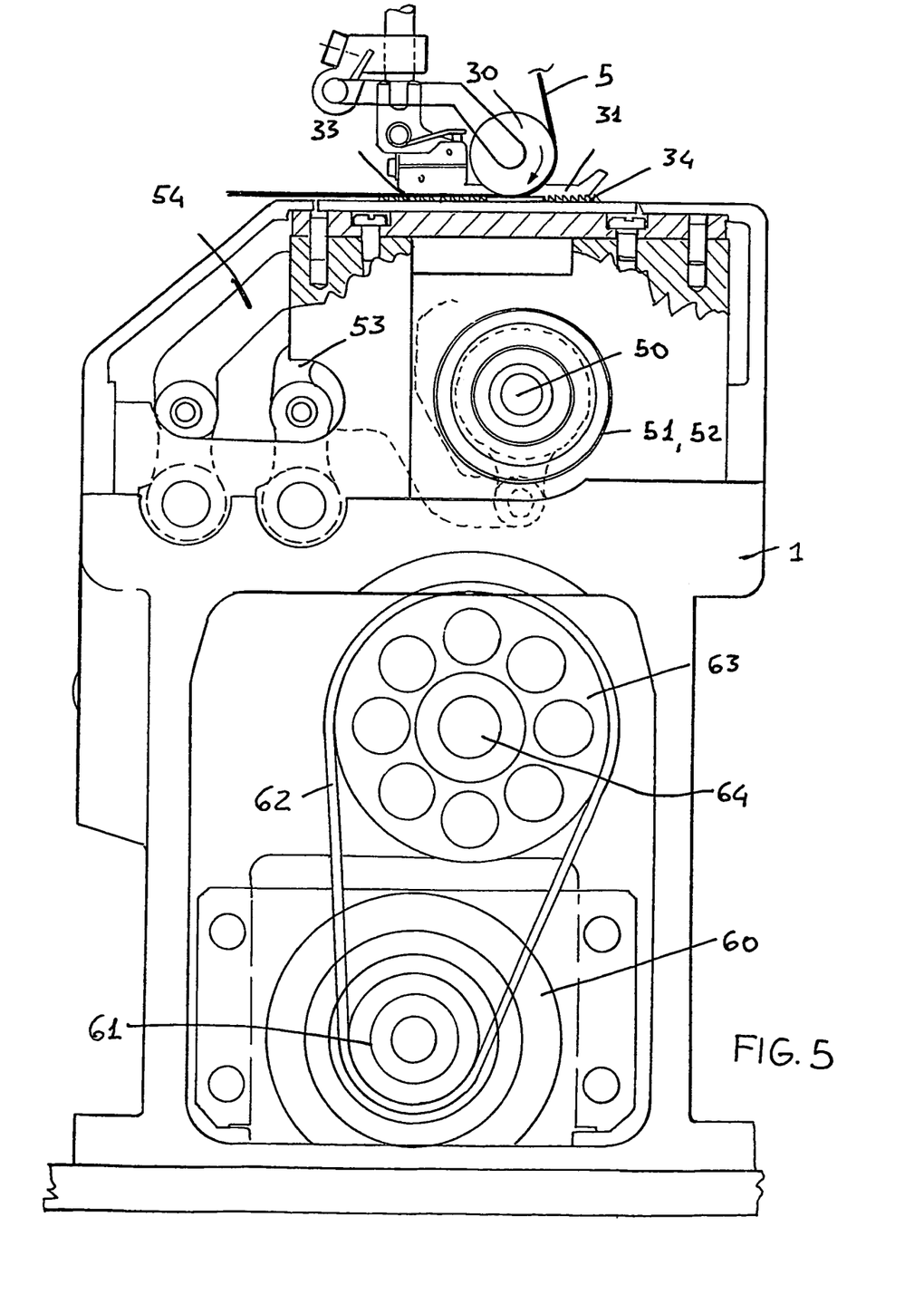
FIG. 5 shows the drive assemblies included in the apparatus according to the invention, being clearly shown the entraining or driving grippers.

Under said foot member are provided respectively a main gripper 33 and a differential gripper 34, the operation of which will be disclosed in a more detailed manner hereinafter.

Figure 6:
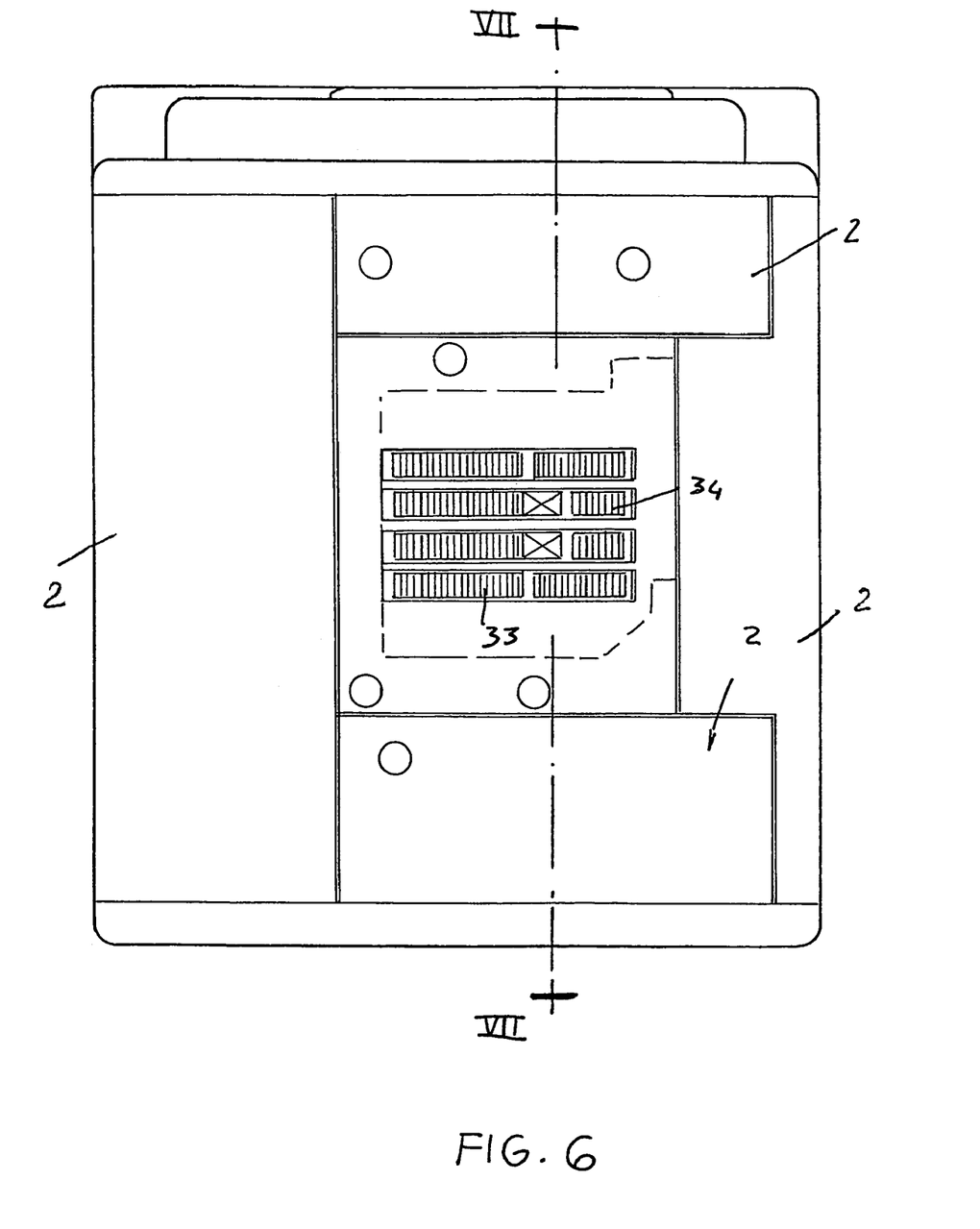
FIG. 6 is a top plan view illustrating the driving grippers.

In particular, the grippers or clamping elements 33 and 34 comprise toothed surfaces and provide a transport movement of a reciprocating elliptical type.

This movement will cause the fabric material to be fed with an indexing type of movement, thereby passing under the front and rear portions of the foot members and pressing roller 30 for the strip 5.

At the central position, the pressure provided by the idling pressing roller 30, together with the gripper, will cause the fabric material to be fed with the above mentioned indexing type of movement.

In particular, the fabric material and strip feeding movements are synchronized with the gripper drive, i.e. of the main gripper 33 and differential gripper 34.

The grippers are driven and supported by two independent arms, allowing to use said grippers either coupled to one another and/or in an independent manner.

Actually, an independent use of said grippers is necessary as only a single gripper must be engaged, which is mounted in replacement of the main gripper 33, by consequently removing the differential gripper 34 and leaving free the related arm.

Said single gripper, in particular, is used for fabrics having an average and large weight, to provide a fabric feeding perfectly synchronized with the movement of said gripper.

In using fabric materials or any other materials to be delicately thermosealed, it would be necessary to connect the main gripper 33 and the differential gripper 34, thereby allowing to properly change the transport movement ratio thereof.

Actually, by a suitable preliminarily manual adjustment, or by an automatic and independent control, it will be possible to adjust the proper conditions for processing the fabric materials.

As shown, the strip pressing roller is mounted on a mounting pin 40, which is supported by a pair of arms 41, articulated on a related support member in turn supported by a foot bearing bar 42.

The foot bearing bar 42, in particular, is rigid with a slide 43, designed for vertically sliding against an urging spring 44.

The slide 43 comprises a pneumatic system for causing said slide to be raised and lowered, the urging spring 44 being designed to be micrometrically adjusted and being downward urged, thereby allowing the foot member 31 to provide a proper pressure on the fabric material.

The mentioned pneumatic system also allows to raise the foot member 31 with the apparatus in a rest condition, to allow the grippers to be easily cleaned, and to perform all the operations to be carried out on said foot member 31.

The latter, in particular, is urged by the urging spring 44 affecting the slide of the foot member 31 so as to allow the main gripper 33 and differential gripper 34 to be properly operated.

Figure 7:
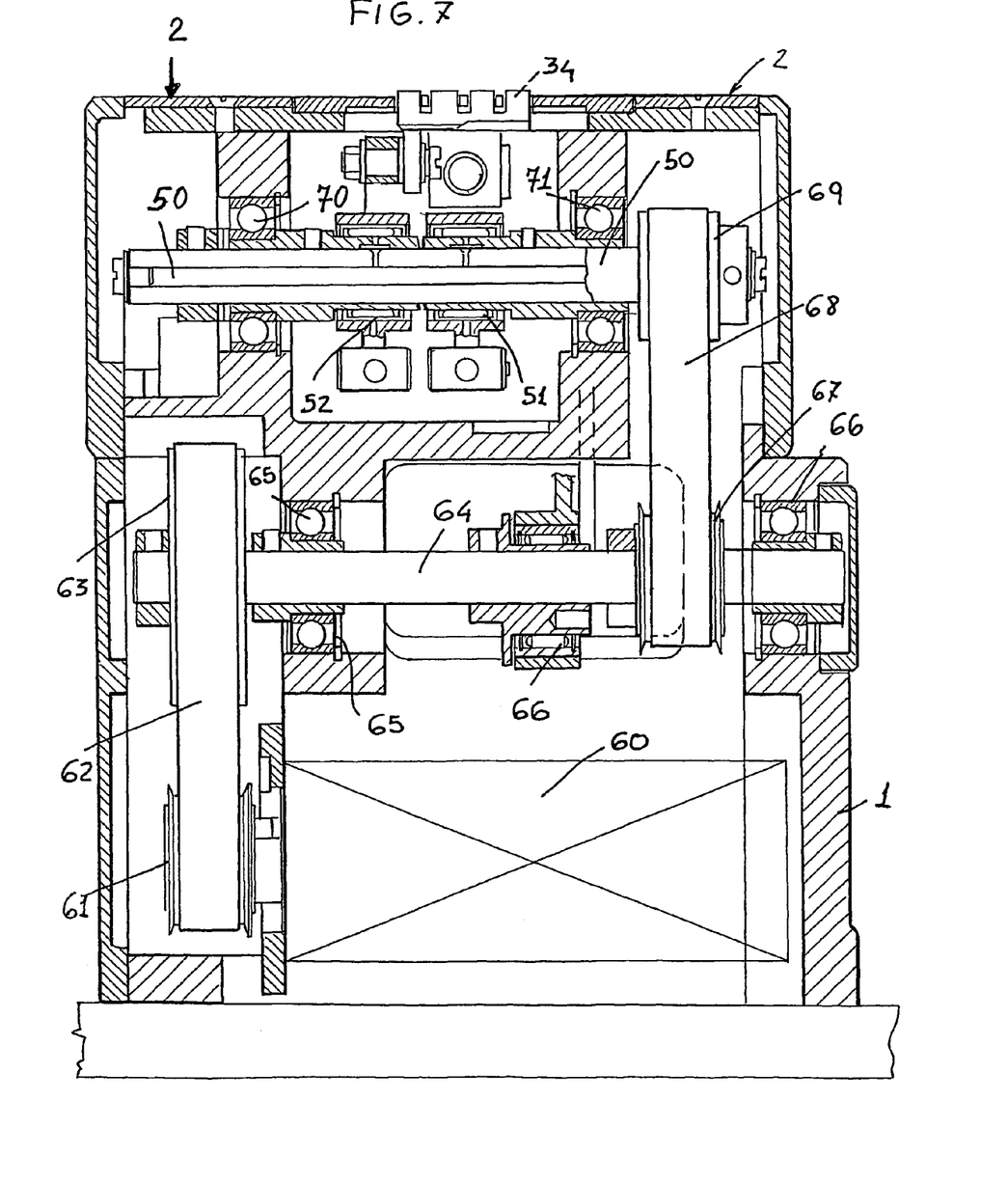
FIG. 7 is a cross sectional view, substantially taken along the line VII-VII of FIG. 6.

More specifically, the grippers 33 and 34 are driven by a main shaft 50 supporting eccentric bodies 51 and 52, for independently raising the main gripper 33 and differential gripper 34.

The two eccentric elements or cams 51 and 52 are connected to the arms 53 and 54 for operating the grippers.

The main gripper 33 drives the fabric material, whereas the differential gripper 34 cooperates with the main gripper 33 with starting loading variable ratios, to allow the fabric material to be fed with any desired feeding speed.

The apparatus according to the invention comprises moreover an electric motor 60, on the shaft of which is keyed a pulley 61, thereon a belt 62 is entrained, which further passes on a pulley 63 keyed on a driven shaft 64.

As the driven shaft 64 is rotatively driven, it drives a further pulley 67, thereon is entrained a belt 68 for rotatively driving yet a further pulley 69, keyed on the main shaft 50.

The driven shaft 64 turns on bearings 65 and 66, whereas the shaft 50 turns on bearings 70 and 71.

Figure 3:
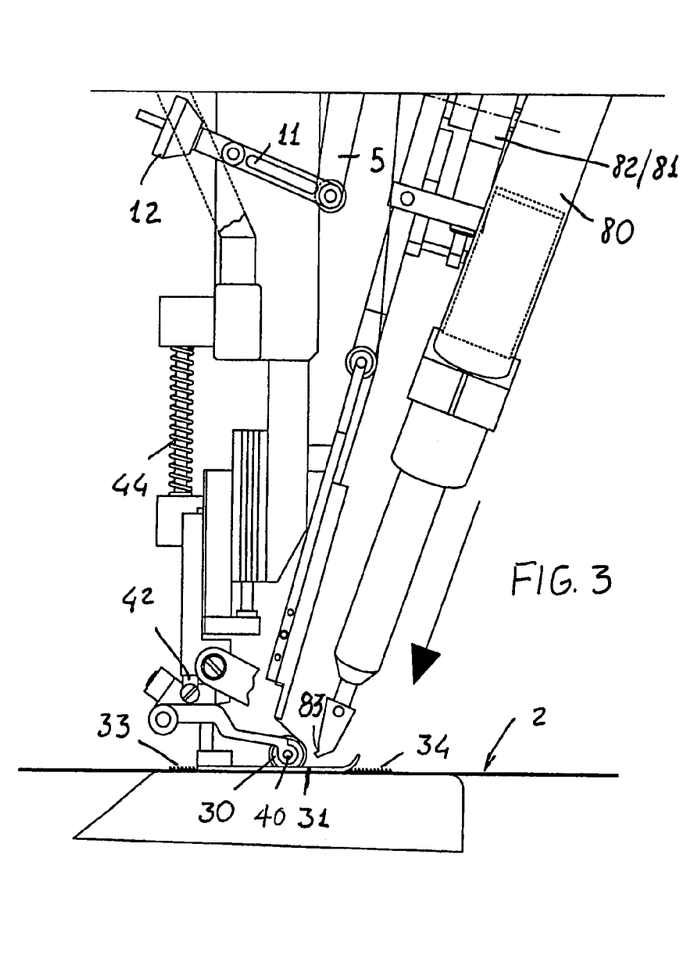
FIG. 3 shows an operating step of the strip blowing and pressing assembly included in the apparatus according to the present invention.

The apparatus according to the present invention comprises, moreover, a hot air blower assembly, generally indicated by the reference number 80, including a blowing nozzle 83 therethrough hot air is blown.

Said air blowing assembly 80 is coupled to the apparatus framework by a pneumatic vertical slide 81 and a horizontal piston 82, performing a rotary and approaching movement during the lowering of the blower assembly 80 to the strip guide pressing roller 30, so as to provide in this condition a hot air jet.

The strip, guided by the pressing roller 30, achieves a comparatively high temperature, thereby thermosealing the strip to the fabric material to which the strip itself must be applied.

From the above disclosure it should be apparent that the invention fully achieves the intended aim and objects.

In particular, the fact is to be pointed out that a very functional apparatus has been provided, allowing to easily apply either a rigid and/or elastic strip or film, of different widths, to an edge of a fabric material, either with or without trimming operations.

Actually, the invention provides an apparatus like a seaming machine having a seaming arm; this is analogous to a conventional seaming machine, for the operator, in performing conventional cloth article making operations.

In a right arm condition (with respect to the position of the operator), is also arranged the movable blowing assembly.

The latter, under a proper control, will affect the working operation thereinabove disclosed for applying the strip.

At the end of the processing operation, the blowing assembly will be located again in the right portion of the apparatus under the arm thereof.

This condition is indispensable as the gripper transport module comprises knives for trimming the right edge of the material to which the strip must be applied.

Since the edge to be trimmed is the right edge, the movement of the knives will be performed on the right side with respect to the fabric pressing assembly, and accordingly the blowing assembly will operate from the right position.

Such a condition will favor and free from any engagement the front and left side region.

This, accordingly, will be an easy and safe condition as in conventional cloth making operations which are conventionally performed on conventional seaming machines.

The invention as disclosed is specifically suitable for all the cloth making operations in which strips or resilient films must be applied on the fabric edge or on curved portions of the fabric.

Such a condition will be obtained by simultaneously performing the strip application and trimming operations, thereby providing an optimum article of manufacture.

In practicing the invention, all the constructional details can be replaced by other technically equivalent elements.

In actual practice, the used materials, as well as the contingent size and shapes, can be any, depending on requirements.

The invention claimed is:

1. An apparatus for assembling and hemming fabric materials by hot applying to said fabric material a strip or film, said apparatus comprising a bearing framework supporting a strip or film supplying spool, said strip or film being entrained on a pulling roller, a transmission roller arranged between said supplying spool and said pulling roller, a sensor roller mounted on a swinging lever, supporting a strip guiding pawl, said strip being further entrained on a strip supplying pulling assembly, downstream of said pawl being provided a guiding assembly having an outlet thereat is arranged a pressing roller associated with a fabric pressing foot assembly cooperating with fabric material entraining grippers for entraining, by an indexing type of entraining, said fabric material, wherein said grippers comprise a removable main gripper and a removable differential gripper, providing a strip transport movement of a reciprocating elliptical type to cause said fabric material to be fed with an indexing type of movement, thereby passing under front and rear portions of said foot assembly and pressing roller, said grippers being driven and supported by two independent arms allowing said grippers to be used either coupled to one another and/or in an independent manner, a single gripper being used for fabric materials having a large weight, whereas said main gripper and differential gripper are connected thereby allowing to properly change the transport movement ratio thereof, for fabric materials to be delicately thermosealed.

2. An apparatus, according to claim 1, wherein said strip supplying assembly is mounted on a counter weighted lever driven by induction sensor means, said induction sensor means causing said strip to be fed in a timed manner with said grippers.

3. An apparatus, according to claim 1, wherein said pulling roller is coupled to a D.C. motor reducing unit.

4. An apparatus, according to claim 1, wherein said guiding assembly has an adjustable width.

5. An apparatus, according to claim 1, wherein said fabric pressing foot assembly is coupled to a supporting element having a vertically movable slide cooperating with a pneumatic raising system for raising mechanical masses, an urging adjustable spring providing a downward directed pressure.

6. An apparatus, according to claim 1, wherein said pressing roller is mounted on a pair of levers pivoted to a fulcrum support element rigid with a bar element supporting said foot assembly.

7. An apparatus, according to claim 1, wherein said apparatus comprises a hot air blowing assembly, coupled to a horizontal translating piston and to a vertical translating pneumatic slide for swinging and lowering said hot air blowing assembly for providing a hot air blowing jet against said pressing roller and said guiding assembly.

8. An apparatus, according to claim 1, wherein said apparatus further comprises an electric motor having an electric motor shaft thereon is keyed a pulley, thereon is entrained a belt in turn entrained on a further pulley keyed on a rotatively driven shaft, said driven shaft driving a further pulley thereon is entrained a belt for turning a respective pulley keyed on a secondary shaft.

9. An apparatus, according to claim 1, wherein said apparatus further comprises knife means for simultaneously trimming away excess strip material applied to a said fabric material.

10. An apparatus, according to claim 1, wherein said apparatus comprises moreover a right arm construction with a hot air blowing assembly at a right housing position.

* * * * *